United States Patent

(12) United States Patent
Mizuno

(10) Patent No.: US 10,734,160 B2
(45) Date of Patent: Aug. 4, 2020

(54) MULTILAYER CERAMIC CAPACITOR

(71) Applicant: TAIYO YUDEN CO., LTD., Taito-ku, Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/438,610

(22) Filed: Feb. 21, 2017

(65) Prior Publication Data
US 2017/0250026 A1 Aug. 31, 2017

(30) Foreign Application Priority Data

Feb. 26, 2016 (JP) .................... 2016-035705

(51) Int. Cl.
*H01G 4/30* (2006.01)
*H01G 4/232* (2006.01)
*H01G 4/252* (2006.01)
*H01G 4/005* (2006.01)
*H01G 4/12* (2006.01)
*H01G 4/012* (2006.01)

(52) U.S. Cl.
CPC ............... *H01G 4/30* (2013.01); *H01G 4/012* (2013.01); *H01G 4/12* (2013.01); *H01G 4/232* (2013.01)

(58) Field of Classification Search
CPC ............ H01G 4/30; H01G 4/12; H01G 4/252; H01G 4/232; H01G 4/005; H01G 4/012; H10G 4/005
USPC ......... 361/321.1, 306.1, 301.4, 321.2, 306.3, 361/303
See application file for complete search history.

(56) References Cited

U.S. PATENT DOCUMENTS 8,995,109 B1 * 3/2015 Tsutsumi ............... B32B 37/10
361/301.4
2012/0229949 A1 * 9/2012 Kim ...................... H01G 4/005
361/321.2
(Continued)

FOREIGN PATENT DOCUMENTS

CN 104576053 A 4/2015
CN 104599841 A 5/2015
(Continued)

OTHER PUBLICATIONS

A Notification of Reasons for Refusal issued by the Japanese Patent Office, dated Jan. 17, 2018, for Japanese counterpart application No. 2016-035705.
(Continued)

*Primary Examiner* — Arun Ramaswamy
(74) *Attorney, Agent, or Firm* — Law Office of Katsuhiro Arai

(57) ABSTRACT

In an embodiment, a multilayer ceramic capacitor 10 has a capacitor body 11 having a first face f1 and a second face f2 in a length direction, a third face f3 and a fourth face f4 in a width direction, a fifth face f5 and a sixth face f6 in a height direction, and a first tapering face f5a between face f1 and face f5 and a second tapering face f5b between face f2 and face 5f; a first external electrode 12 that has a first part 12a along face f1, a second part 12b along face f5, and continuously a third part 12c along face f5a; and a second external electrode 13 that has a first part 13a along face f2, a second part 13b along face f5, and continuously a third part 13c along face f5b.

16 Claims, 4 Drawing Sheets

(56) References Cited

U.S. PATENT DOCUMENTS

| | | | | |
|---|---|---|---|---|
| 2013/0020913 A1* | 1/2013 | Shirakawa | ............... | H01G 4/30 |
| | | | | 310/364 |
| 2013/0070386 A1* | 3/2013 | Kim | ......................... | H01G 4/30 |
| | | | | 361/301.4 |
| 2013/0229748 A1* | 9/2013 | Chung | ................... | H01G 4/005 |
| | | | | 361/301.4 |
| 2015/0116896 A1* | 4/2015 | Inazuka | ............... | H01G 4/1227 |
| | | | | 361/301.4 |

FOREIGN PATENT DOCUMENTS

| | | |
|---|---|---|
| JP | S6312120 A | 1/1988 |
| JP | H04263410 A | 9/1992 |
| JP | 2004056112 A | 2/2004 |
| JP | 2012004480 A | 1/2012 |
| JP | 2012164966 A | 8/2012 |
| JP | 2012253338 A | 12/2012 |
| JP | 2015026841 A | 2/2015 |
| JP | 2015228481 A | 12/2015 |

OTHER PUBLICATIONS

A First Office Action issued by the State Intellectual Property Office of China dated Nov. 28, 2019 for Chinese counterpart application 201710007095.3 (8 pages).

A Notification of Reasons for Refusal issued by the Japanese Patent Office, dated May 22, 2019, for related Japanese application No. 2018-172292. (3 pages).

* cited by examiner

MULTILAYER CERAMIC CAPACITOR

BACKGROUND

Field of the Invention

The present invention relates to a multilayer ceramic capacitor constituted by a capacitor body and external electrodes of roughly L shape provided on the opposing ends thereof.

Description of the Related Art

A known mode of external electrodes provided on the opposing ends of a multilayer ceramic capacitor involves external electrodes of roughly L shape, each having a part along one length-direction face, and a part along one height-direction face, of the capacitor body (refer to Patent Literature 1 mentioned later). The following explains the concerns raised by this conventional multilayer ceramic capacitor with external electrodes of roughly L shape, by using FIGS. 1A through 1C.

As shown in FIGS. 1A and 1B, the size of the multilayer ceramic capacitor 100 is specified by the length L, width W, and height H. This multilayer ceramic capacitor 100 has a capacitor body 101 of roughly rectangular solid shape, a first external electrode 102 of roughly L shape, and a second external electrode 103 of roughly L shape. The capacitor body 101 has a built-in capacitive part (not accompanied by symbol) constituted by multiple first internal electrode layers 104 and multiple second internal electrode layers 105 stacked alternately with dielectric layers 106 in between. The first external electrode 102 has a first part 102a along one length-direction face (left face in FIG. 1B) of the capacitor body 101, as well as a second part 102b along one height-direction face (bottom face in FIG. 1B) of the capacitor body 101, where one length-direction end (left end in FIG. 1B) of each of the multiple first internal electrode layers 104 is connected to the first part 102a. The second external electrode 103 has a first part 103a along the other length-direction face (right face in FIG. 1B) of the capacitor body 101, as well as a second part 103b along one height-direction face (bottom face in FIG. 1B) of the capacitor body 101, where the other length-direction end (right end in FIG. 1B) of each of the multiple second internal electrode layers 105 is connected to the first part 103a.

FIG. 1C shows a condition where the multilayer ceramic capacitor 100 is mounted on a circuit board CB. To mount the multilayer ceramic capacitor 100 on the circuit board CB, cream solder is printed on the surface of each conductor pad CP corresponding to the multilayer ceramic capacitor 100, after which the multilayer ceramic capacitor 100 is installed in such a way that the exterior face of the second part 102b of the first external electrode 102, and the exterior face of the second part 103b of the second external electrode 103, each contact the cream solder. Next, the circuit board CB on which the multilayer ceramic capacitor 100 is installed is introduced into a reflow furnace or other heating furnace, to bond the second part 102b of the first external electrode 102 to one conductor pad CP via solder SOL, and also bond the second part 103b of the second external electrode 103 to the other conductor pad CP via solder SOL.

An appropriate amount of cream solder to not cause bonding failure is provided on the surface of each conductor pad CP, and therefore, in the aforementioned bonding process, a part of the molten solder on the first external electrode 102 side wets the exterior face of the first part 102a to form a fillet FI, while a part of the molten solder on the second external electrode 103 side wets the exterior face of the first part 103a to form a fillet FI, as shown in FIG. 1C.

This means that, if the circuit board CB warps or extends/contracts in a mounted condition as shown in FIG. 1C, the forces shown by the thick arrows in the figure are likely to apply to the first part 102a of the first external electrode 102 and the first part 103a of the second external electrode 103 from the respective fillets FI, and these forces may cause the first part 102a of the first external electrode 102 to separate from one length-direction face of the capacitor body 101, while causing the first part 103a of the second external electrode 103 to separate from the other length-direction face of the capacitor body 101.

BACKGROUND ART LITERATURES

[Patent Literature 1] Japanese Patent Laid-open No. 2015-228481

SUMMARY

An object of the present invention is to provide a multilayer ceramic capacitor that, while mounted on a circuit board, does not cause the first part of its first external electrode or the first part of its second external electrode to separate easily, even when the circuit board warps or extends/contracts.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor proposed by the present invention is a multilayer ceramic capacitor comprising: (1) a capacitor body having a first face and a second face that are facing each other in the length direction, a third face and a fourth face that are facing each other in the width direction, and a fifth face and a sixth face that are facing each other in the height direction, as well as a built-in capacitive part constituted by multiple first internal electrode layers and multiple second internal electrode layers stacked alternately with dielectric layers in between; (2) a first external electrode having a first part along the first face, and a second part along the fifth face, of the capacitor body, where ends of the multiple first internal electrode layers are connected to the first part, respectively; and (3) a second external electrode having a first part along the second face, and a second part along the fifth face, of the capacitor body, where ends of the multiple second internal electrode layers are connected to the first part, respectively; wherein the capacitor body has, over the entire width direction and at a position adjacent to the first face, a first tapering face that decreases the height-direction dimension of the first face, and also has, over the entire width direction and at a position adjacent to the second face, a second tapering face that decreases the height-direction dimension of the second face; the first external electrode has, between the first part and the second part, a third part along the first tapering face of the capacitor body; the second external electrode has, between the first part and the second part, a third part along the second tapering face of the capacitor body; and the first external electrode and second external electrode are each shaped in such a way that, when the exterior face of the second part of the first external electrode and the exterior face of the second part of the second external electrode are each contacting a virtual plane, a first clearance that narrows from the outer side toward the inner side is formed between the exterior face of the third part of the first external electrode and the virtual plane, while a second clearance that narrows from the outer side toward the inner side is formed between the exterior face of the third part of the second external electrode and the virtual plane.

According to the present invention, a multilayer ceramic capacitor can be provided that, while mounted on a circuit board, does not cause the first part of its first external electrode or the first part of its second external electrode to separate easily, even when the circuit board warps or extends/contracts.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 5A is a view of the multilayer ceramic capacitor shown in FIG. 2 from the first face f1 side of the capacitor body, while

DESCRIPTION OF THE SYMBOLS

Figure 1A:
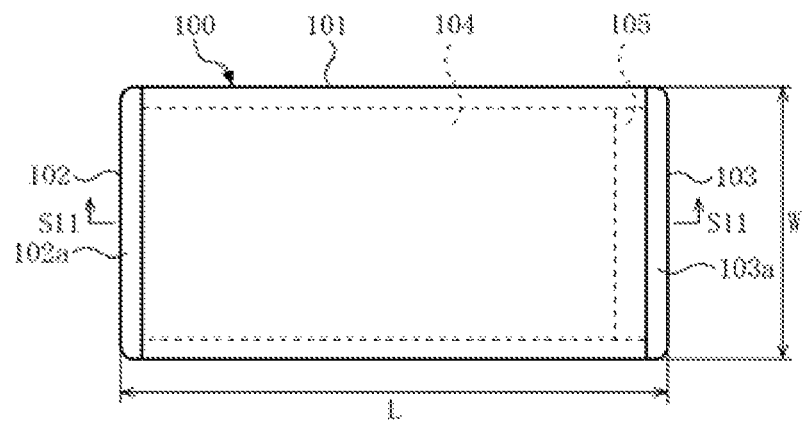
FIG. 1A is a top view of a conventional multilayer ceramic capacitor.

10 - - - Multilayer ceramic capacitor, 11 - - - Capacitor body, f1 - - - First face of the capacitor body, f2 - - - Second face of the capacitor body, f3 - - - Third face of the capacitor body, f4 - - - Fourth face of the capacitor body, f5 - - - Fifth face of the capacitor body, f5a - - - First tapering face on the fifth face, f5b - - - Second tapering face on the fifth face, f6 - - - Sixth face of the capacitor body, f6a - - - First tapering face on the sixth face, fhb - - - Second tapering face on the sixth face, 12 - - - First external electrode, 12a - - - First part of the first external electrode, 12b - - - Second part of the first external electrode, 12c - - - Third part of the first external electrode, 13 - - - Second external electrode, 13a - - - First part of the second external electrode, 13b - - - Second part of the second external electrode, 13c - - - Third part of the second external electrode, VP - - - Virtual plane, CL1 - - - First clearance, GP1a - - - Length-direction gap in the first clearance, GP1b - - - Width-direction gap in the first clearance, CL2 - - - Second clearance, GP2a - - - Length-direction gap in the second clearance, GP2b - - - Width-direction gap in the second clearance.

DETAILED DESCRIPTION OF EMBODIMENTS

First, a multilayer ceramic capacitor 10 to which the present invention is applied is explained using FIGS. 2 to 6.

It should be noted that, while the multilayer ceramic capacitor 10 depicted in FIGS. 2 to 6 has its length L, width W and height H as described below meeting a relationship of "Length L>Width W=Height H," the relationship of length L, width W and height H can be "Length L>Width W>Height H," "Length L>Height H>Width W," "Width W>Length L=Height H," "Width W>Length L>Height H," or "Width W>Height H>Length L." Also, while the number of the first internal electrode layers 14 as described below is eight and that of the second internal electrode layers 15 as described below is also eight, and the number of the dielectric layers 16 as described below is 15, this is merely for the purpose of illustration and the number of first internal electrode layers 14 and that of second internal electrode layers 15 can be nine or more (the number of dielectric layers 16 is 17 or more), or seven or less (the number of dielectric layers 16 is 13 or less).

The size of the multilayer ceramic capacitor 10 is specified by its length L, width W, and height H. This multilayer ceramic capacitor 10 has a capacitor body 11 of roughly rectangular solid shape, a first external electrode 12 of roughly L shape, and a second external electrode 13 of roughly L shape.

The capacitor body 11 has a first face f1 and a second face f2 that are facing each other in the length direction, a third face f3 and a fourth face f4 that are facing each other in the width direction, and a fifth face f5 and a sixth face f6 that are facing each other in the height direction. Also, the capacitor body 11 has a built-in capacitive part (not accompanied by symbol) constituted by eight first internal electrode layers 14 and eight second internal electrode layers 15 that are stacked alternately with dielectric layers 16 in between, wherein both sides in the width direction, and both sides in the height direction, of the capacitive part, are covered with dielectric margin parts (not accompanied by symbol). It should be noted that the eight first internal electrode layers 14 each have a rectangular contour, while the eight second internal electrode layers 15 each have a rectangular contour, and the contour dimensions and thickness of each first internal electrode layer 14 are roughly the same as the contour dimensions and thickness of each second internal electrode layer 15. Also, the 15 dielectric layers 16 each have roughly the same thickness.

One length-direction end (left end in FIG. 6) of each first internal electrode layer 14 constitutes a lead part 14a, where the end of each lead part 14a is led out to the first face f1 of the capacitor body 11, and each end is connected to the first part 12a as described below of the first external electrode 12. Also, one length-direction end (right end in FIG. 6) of each second internal electrode layer 15 constitutes a lead part 15a, where the end of each lead part 15a is led out to the second face f2 of the capacitor body 11, and each end is connected to the first part 13a, as described below, of the second external electrode 13.

The first face f1, second face f2, third face f3, and fourth face f4 of the capacitor body 11 are each a roughly or substantially flat surface. The fifth face f5 is a convex curved face with a bulged center in the width direction, except for the parts corresponding to the first tapering face f5a and second tapering face f5b as described below, while the sixth face f6 is a convex curved face with a bulged center in the width direction, except for the parts corresponding to the first tapering face f6a and second tapering face f6b as described below.

Additionally, the fifth face f5 of the capacitor body 11 has, over the entire width direction and at a position adjacent to the first face f1, a first tapering face f5a that decreases the height-direction dimension of the first face f1, and also has, over the entire width direction and at a position adjacent to the second face f2, a second tapering face f5b that decreases the height-direction dimension of the second face f2. The sixth face f6 of the capacitor body 11 has, over the entire width direction and at a position adjacent to the first face f1, a first tapering face f6a that decreases the height-direction dimension of the first face f1, and also has, over the entire width direction and at a position adjacent to the second face f2, a second tapering face f6b that decreases the height-direction dimension of the second face f2.

Figure 5A:
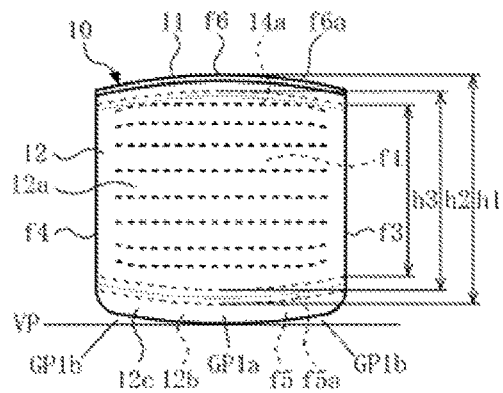
Figure 5B:
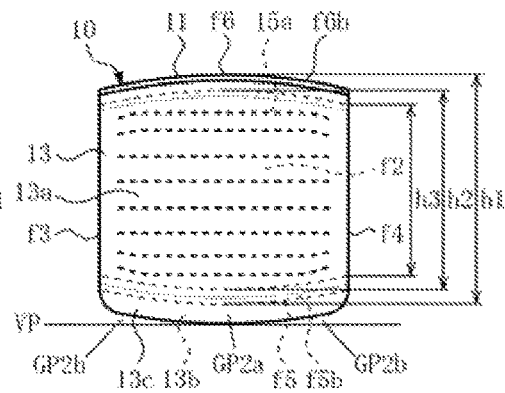
FIG. 5B is a view of the multilayer ceramic capacitor shown in FIG. 2 from the second face f2 side of the capacitor body.

To be specific, the first tapering face f5a on the fifth face f5 is a convex curved face having a bulged center in the width direction and inclined toward the first face f1, and the second tapering face f5b is also a convex curved face having a bulged center in the width direction and inclined toward the second face f2. The first tapering face f6a on the sixth face f6 is a convex curved face having a bulged center in the width direction and inclined toward the first face f1, and the second tapering face f6b is also a convex curved face having a bulged center in the width direction and inclined toward the second face f2. Referring to FIGS. 5A and 5B, the first tapering face f5a and second tapering face f5b on the fifth face f5 and the first tapering face f6a and second tapering face f6b on the sixth face f6 are convex curved faces, respectively, that satisfy the condition of "h1>h2>h3" where h1 represents the maximum height-direction dimension between the fifth face f5 and sixth face f6, h2 represents the maximum height-direction dimension of the first face f1 and that of the second face f2, respectively, and h3 represents the minimum height-direction dimension of the first face f1 and that of the second face f2, respectively.

Figure 6:
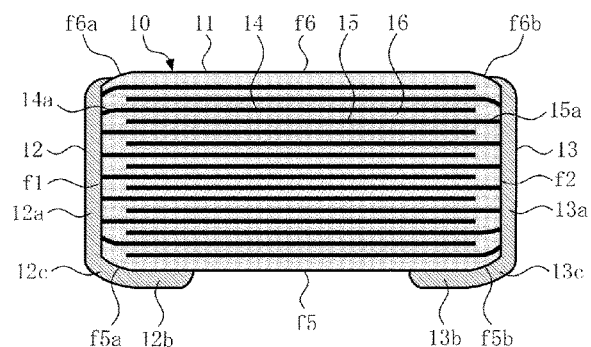
FIG. 6 is a section view of FIG. 2 along line S1-S1.

It is clear from FIG. 6 that, because the first tapering face f5a and second tapering face f5b on the fifth face f5 are each a convex curved face, and the first tapering face f6a and second tapering face f6b on the sixth face f6 are each a convex curved face, one length-direction end (left end in FIG. 6) of each of the several first internal electrode layers 14 close to these faces and one length-direction end (right end in FIG. 6) of each of the several second internal electrode layers 15 close to these faces are curved inward, respectively. It is also clear from FIGS. 5A and 5B that, because the fifth face f5 is a convex curved face except for the parts corresponding to the first tapering face f5a and second tapering face f5b, and the sixth face f6 is a convex curved face except for the parts corresponding to the first tapering face f6a and second tapering face f6b, both width-direction ends (left and right ends in FIG. 5A) of each of the several first internal electrode layers 14 close to these faces and both width-direction ends (left and right ends in FIG. 5B) of each of the several second internal electrode layers 15 close to these faces are also curved inward, respectively.

It should be noted that, while the first tapering face f5a, second tapering face f5b, first tapering face f6a, and second tapering face f6b shown in FIGS. 2 to 6 are roughly the same, respectively, in terms of their length-direction dimension and configuration of convex curved face, each can have a slightly different length-direction dimension or a slightly different configuration of convex curved face. Also, the first tapering face f5a, second tapering face f5b, first tapering face f6a, and second tapering face f6b need not all be a convex curved face having a single radius of curvature; instead, they can each be a curved face whose radius of curvature varies but which assumes the shape of a convex curved face overall, or a combination of multiple curved faces of different shapes that together assume the shape of a convex curved face, or a face with some roughly flat areas that assumes the shape of a convex curved face overall, for example.

The first external electrode 12 has a first part 12a along the first face f1 of the capacitor body 11, a second part 12b along the fifth face f5 (excluding the first tapering face f5a) of the capacitor body 11, and a third part 12c along the first tapering face f5a on the fifth face f5 of the capacitor body 11. On the other hand, the second external electrode 13 has a first part 13a along the second face f2 of the capacitor body 11, a second part 13b along the fifth face f5 (excluding the second tapering face f5b) of the capacitor body 11, and a third part 13c along the second tapering face f5b on the fifth face f5 of the capacitor body 11. It should be noted that the first external electrode 12 and second external electrode 13 have roughly the same thickness, except at their outer peripheries, respectively. Although not illustrated, the first external electrode 12 and second external electrode 13 each have a two-layer structure constituted by a base film contacting the exterior face of the capacitor body 11 and a surface film contacting the exterior face of the base film, or a multi-layer structure constituted by a base film, a surface film, and at least one intermediate film in between.

Figure 3:
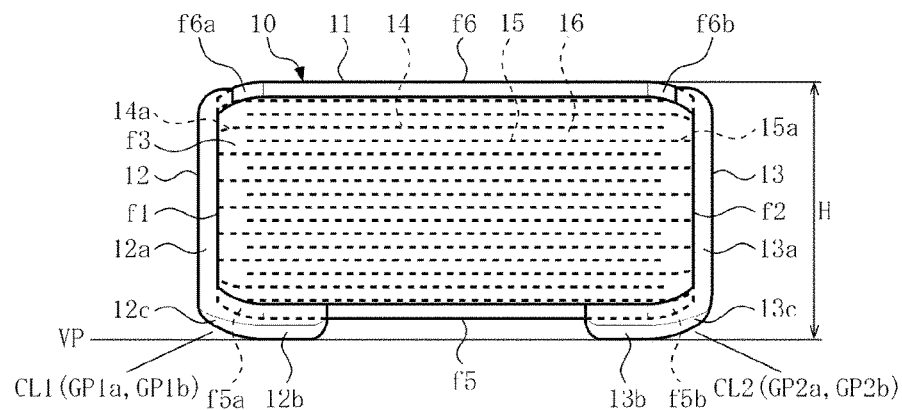
FIG. 3 is a view of the multilayer ceramic capacitor shown in FIG. 2 from the third face f3 side of the capacitor body.

As shown in FIGS. 3 and 5A, the first part 12a of the first external electrode 12 has a part (not accompanied by symbol) that extends slightly onto the first tapering face f6a on the sixth face f6 of the capacitor body 11, while the first part 13a of the second external electrode 13 has a part (not accompanied by symbol) that extends slightly onto the second tapering face fhb on the sixth face f6 of the capacitor body 11. Also, the third part 12c of the first external electrode 12 along the first tapering face f5a on the fifth face f5 of the capacitor body 11 has a shape matching the first tapering face f5a, while the third part 13c of the second external electrode 13 along the second tapering face f5b on the fifth face f5 of the capacitor body 11 has a shape matching the second tapering face f5b. To be specific, the third part 12c of the first external electrode 12 and the third part 13c of the second external electrode 13 are each shaped in such a way that, when the exterior face of the second part 12b of the first external electrode 12 and the exterior face of the second part 13b of the second external electrode 13 are each contacting a virtual plane VP, a first clearance CL1 that narrows from the outer side toward the inner side is formed between the exterior face of the third part 12c of the first external electrode 12 and the virtual plane VP, while a second clearance CL2 that narrows from the outer side toward the inner side is formed between the exterior face of the third part 13c of the second external electrode 13 and the virtual plane VP.

As described earlier, the first tapering face f5a on the fifth face f5 of the capacitor body 11 is a convex curved face having a bulged center in the width direction and inclined toward the first face f1, and therefore the first clearance CL1 includes a length-direction gap GP1a formed between the exterior face of the third part 12c of the first external electrode 12 and the virtual plane VP, as well as two width-direction gaps GP1b continuing from the length-direction gap GP1a. Also, the second tapering face f5b on the fifth face f5 of the capacitor body 11 is a convex curved face having a bulged center in the width direction and inclined toward the second face f2, and therefore the second clearance CL2 includes a length-direction gap GP2a formed between the exterior face of the third part 13c of the second external electrode 13 and the virtual plane VP, as well as two width-direction gaps GP2b continuing from the length-direction gap GP2a. In addition, the fifth face f5 is a convex curved face having a bulged center in the width direction, except for the parts corresponding to the first tapering face f5a and second tapering face f5b, and therefore the two width-direction gaps GP1b constituting the first clearance CL1 also extend to the outer edges, in the width direction, of the second part 12b of the first external electrode 12, while the two width-direction gaps GP2b constituting the second clearance CL2 also extend to the outer edges, in the width direction, of the second part 13b of the second external electrode 13.

As additional features of the materials, etc., preferably a dielectric ceramic whose primary component is barium titanate, strontium titanate, calcium titanate, magnesium titanate, calcium zirconate, calcium titanate zirconate, barium zirconate, titanium oxide, etc., or more preferably a dielectric ceramic of ε>1000 or Class 2 (high dielectric constant type), can be used for the capacitor body 11, except for each first internal electrode layer 14 and each second internal electrode layer 15.

Also, preferably a good conductor whose primary component is nickel, copper, palladium, platinum, silver, gold, alloy thereof, etc., can be used for each first internal electrode layer 14 and each second internal electrode layer 15.

In addition, the base film of the first external electrode 12 and that of the second external electrode 13 are each constituted by a baked film or plating film, for example, and preferably a good conductor whose primary component is nickel, copper, palladium, platinum, silver, gold, alloy thereof, etc., can be used for such base film. The surface film is constituted by a plating film, for example, and preferably a good conductor whose primary component is copper, tin, palladium, gold, zinc, alloy thereof, etc., can be used for such surface film. The intermediate film is constituted by a plating film, for example, and preferably a good conductor whose primary component is platinum, palladium, gold, copper, nickel, alloy thereof, etc., can be used for such intermediate film.

Next, two manufacturing examples appropriate for the manufacture of the multilayer ceramic capacitor 10 are explained by citing the symbols in FIGS. 2 to 6 as deemed appropriate.

First Manufacturing Example

For the manufacture, a ceramic slurry containing dielectric ceramic powder, and an electrode paste containing good conductor powder, are prepared. Next, the ceramic slurry is coated on the surface of carrier films and then dried, to prepare first green sheets. Also, the electrode paste is printed on the surface of first green sheets and then dried, to prepare second green sheets on which internal electrode patterns are formed and which will become first internal electrode layers 14 and second internal electrode layers 15.

Next, a specified number of unit sheets cut out from the first green sheets are stacked and thermally bonded one by one, to prepare an area corresponding to one margin part in the height direction. Also, a specified number of unit sheets (including internal electrode patterns) cut out from the second green sheets are stacked and thermally bonded one by one, to prepare an area corresponding to the capacitive part. Furthermore, a specified number of unit sheets cut out from the first green sheets are stacked and thermally bonded one by one, to prepare an area corresponding to the other margin part in the height direction. Finally, the entire stack is thermally bonded for one last time to prepare an unsintered laminate sheet. In this preparation process of unsintered laminate sheet, the thickness or shape of the elastic sheet used for bonding, made of synthetic rubber, etc., is changed so that the surface curves corresponding to the fifth face f5 (including the first tapering face f5a and second tapering face f5b) and sixth face f6 (including the first tapering face f6a and second tapering face f6b) of the capacitor body 11 as shown in FIGS. 2 to 6 are formed on the top face and bottom face of the unsintered laminate sheet.

Next, the unsintered laminate sheet is cut to a grid to prepare unsintered chips, each corresponding to the capacitor body 11. Next, the multiple unsintered chips are sintered (including binder removal and sintering) all at once in an ambience and at a temperature profile appropriate for the dielectric ceramic powder contained in the ceramic slurry and for the good conductor powder contained in the electrode paste, to prepare sintered chips. Next, the multiple sintered chips are barreled all at once to round the corners and ridgelines, to prepare capacitor bodies 11.

Next, the first face f1 and second face f2 of each capacitor body 11 are dipped in an electrode paste (same as the aforementioned electrode paste or a different electrode paste containing a different type of good conductor powder), respectively, and then dried, followed by baking, to form a base film for the external electrodes. It should be noted that this base film can also be formed by sputtering, vacuum deposition, or other dry plating method that forms a good conductor film on the first face f1 and second face f2 of the capacitor body 11, respectively.

Next, an electrode paste (same as the aforementioned electrode paste or a different electrode paste containing a different type of good conductor powder) is printed on both length-direction ends of the fifth face f5 of the capacitor body 11, respectively, and then dried, followed by baking, to form another base film for the external electrodes in a manner continuing from the aforementioned base film. It should be noted that this base film can also be formed by sputtering, vacuum deposition, or other dry plating method that forms a good conductor film on both length-direction ends of the fifth face f5 of the capacitor body 11, respectively.

Next, a surface film covering the two continuous base films, or an intermediate film and a surface film, is/are formed by electroplating, electroless plating, or other wet plating method, or by sputtering, vacuum deposition, or other dry plating method, to prepare a first external electrode 12 and a second external electrode 13, respectively.

Second Manufacturing Example

For the manufacture, a ceramic slurry containing dielectric ceramic powder, and an electrode paste containing good conductor powder, are prepared. Next, the ceramic slurry is coated on the surface of carrier films and then dried, to prepare first green sheets. Also, the electrode paste is printed on the surface of first green sheets and then dried, to prepare second green sheets on which internal electrode patterns are formed and which will become first internal electrode layers 14 and second internal electrode layers 15. Furthermore, the electrode paste is printed on the surface of first green sheets and then dried, to prepare third green sheets on which base patterns are formed. These base patterns are aggregates of roughly rectangular patterns corresponding to the base film at the second part 12b of the first external electrode 12 and those corresponding to the base film at the second part 13b of the second external electrode 13.

Next, a specified number of unit sheets cut out from the first green sheets are stacked and thermally bonded one by one, to prepare an area corresponding to one margin part in the height direction. Also, a specified number of unit sheets (including internal electrode patterns) cut out from the second green sheets are stacked and thermally bonded one by one, to prepare an area corresponding to the capacitive part. Furthermore, a specified number of unit sheets cut out from the first green sheets are stacked and thermally bonded one by one, and then unit sheets (including base patterns) cut out from the third green sheets are stacked and thermally bonded one by one, to prepare an area corresponding to the other margin part in the height direction. Finally, the entire stack is thermally bonded for one last time to prepare an unsintered laminate sheet. In this preparation process of unsintered laminate sheet, the thickness or shape of the elastic sheet used for bonding, made of synthetic rubber, etc., is changed so that the surface curves corresponding to the fifth face f5 (including the first tapering face f5a and second tapering face f5b) and sixth face f6 (including the first tapering face f6a and second tapering face fhb) of the capacitor body 11 as shown in FIGS. 2 to 6 are formed on the top face and bottom face of the unsintered laminate sheet.

Next, the unsintered laminate sheet is cut to a grid to prepare unsintered chips, each corresponding to the capacitor body 11. These unsintered chips each have a base pattern present on both length-direction ends of the face corresponding to the fifth face f5 of the capacitor 11. Next, the multiple unsintered chips are sintered (including binder removal and sintering) all at once in an ambience and at a temperature profile appropriate for the dielectric ceramic powder contained in the ceramic slurry and for the good conductor powder contained in the electrode paste, to prepare sintered chips. Next, the multiple sintered chips are barreled all at once to round the corners and ridgelines, to prepare capacitor bodies 11. These capacitor bodies 11 each have a base or underlying film for the second part 12b of the first external electrode 12 on one of the length-direction ends of the fifth face f5, as well as a base or underlying film for the second part 13b of the second external electrode 13 on the other end.

Next, the first face f1 and second face f2 of each capacitor body 11 are dipped in an electrode paste (same as the aforementioned electrode paste or a different electrode paste containing a different type of good conductor powder), respectively, and then dried, followed by baking, to form another base film for the external electrodes in a manner continuing from the aforementioned base film. It should be noted that this base film can also be formed by sputtering, vacuum deposition, or other dry plating method that forms a good conductor film on the first face f1 and second face f2 of the capacitor body 11, respectively.

Next, a surface film covering the two continuous base films, or an intermediate film and a surface film, is/are formed by electroplating, electroless plating, or other wet plating method, or by sputtering, vacuum deposition, or other dry plating method, to prepare a first external electrode 12 and a second external electrode 13, respectively.

Next, the effects achieved by the multilayer ceramic capacitor 10 are explained by using FIGS. 7, and 8A through 8C.

Figure 7:
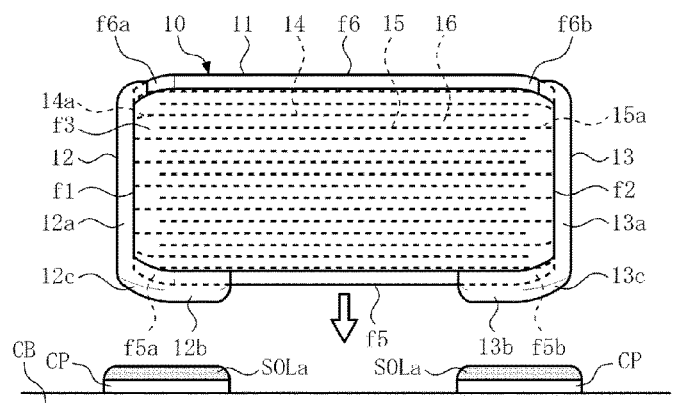
FIG. 7 is a drawing explaining an installation process through which the multilayer ceramic capacitor shown in FIG. 2 is mounted on a circuit board.

In FIG. 7, CB represents a circuit board, CP represents each of two rectangular contoured conductor pads provided on the circuit board CB, and SOLa represents cream solder. The length-direction dimension of each conductor pad CP is slightly longer than the length-direction dimension L1 (refer to FIG. 4) of the first external electrode 12 and of the second external electrode 13 when the multilayer ceramic capacitor 10 is viewed from the fifth face f5 side of the capacitor body 11, while the width-direction dimension of each conductor pad CP is roughly the same as the width W (refer to FIG. 4) of the multilayer ceramic capacitor 10.

Figure 8A:
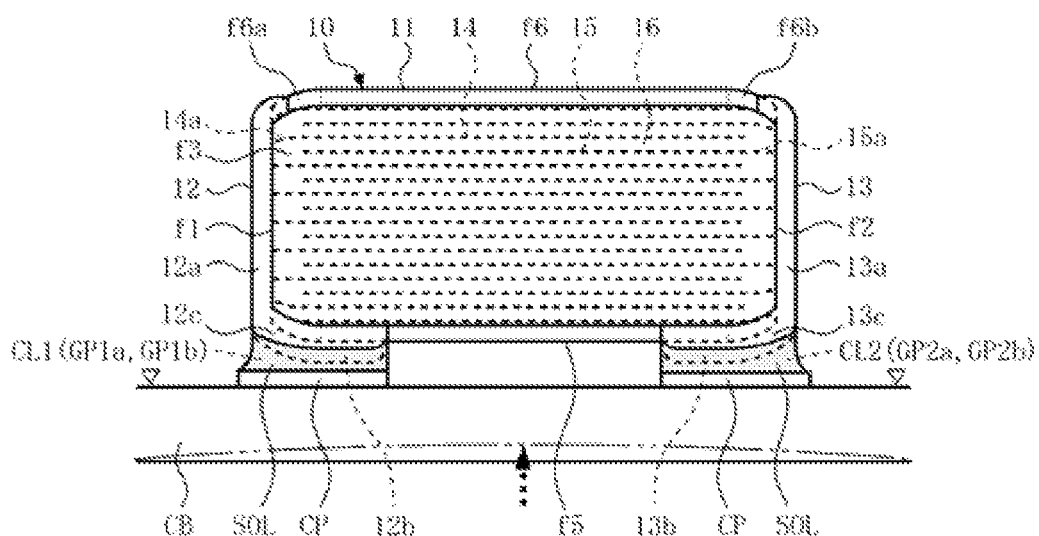
FIGS. 8A, 8B, and 8C are drawings explaining a bonding process through which the multilayer ceramic capacitor shown in FIG. 2 is mounted on a circuit board.
Figure 8B:
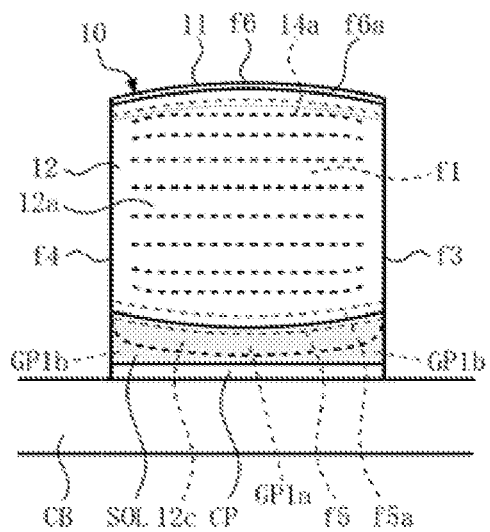
Figure 8C:
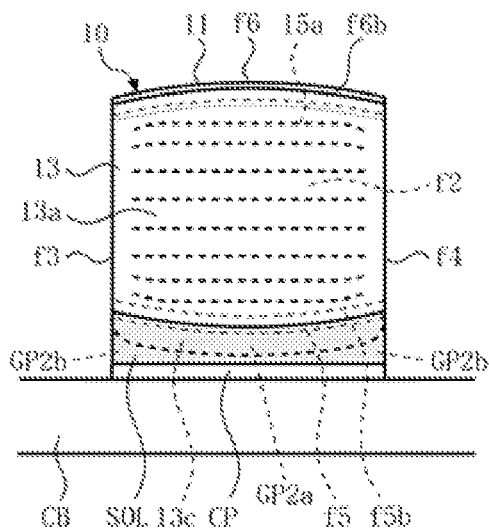

To mount the multilayer ceramic capacitor 10 on the circuit board CB, cream solder SOLa is printed on the surface of each conductor pad CP, after which the multilayer ceramic capacitor 10 is installed in such a way that the exterior face of primarily the second part 12b of the first external electrode 12, and the exterior face of primarily the second part 13b of the second external electrode 13, each contact the cream solder SOLa, as shown in FIG. 7. Next, the circuit board CB on which the multilayer ceramic capacitor 10 is installed is introduced into a reflow furnace or other heating furnace to bond the second part 12b and third part 12c of the first external electrode 12 to one conductor pad CP via solder SOL, and also bond the second part 13b and third part 13c of the second external electrode 13 to the other conductor pad CP via solder SOL, as shown in FIG. 8A through 8C.

In the bonding process, the molten solder on the first external electrode 12 side behaves in a manner being suctioned into the first clearance CL1 that narrows from the outer side toward the inner side, while the molten solder on the second external electrode 13 side behaves in a manner being suctioned into the second clearance CL2 that narrows from the outer side toward the inner side. This suppresses formation of fillets as a result of solder oozing out to the outer side of the first external electrode 12 and that of the second external electrode 13. In other words, application of the forces indicated by the thick arrows in FIG. 1C to the first part 12a of the first external electrode 12 and to the first part 13a of the second external electrode 13 can be avoided, even when the circuit board CB warps or extends/contracts while the multilayer ceramic capacitor 10 is mounted on it, and consequently a phenomenon where the first part 12a of the first external electrode 12 separates from the first face f1 of the capacitor body 11 does not occur easily, and a phenomenon where the first part 13a of the second external electrode 13 separates from the second face f2 of the capacitor body 11 does not occur easily, either.

In addition, fillet formation can be suppressed and the required bonding can be implemented even when the contour dimension of each conductor pad CP of the circuit board CB is reduced to a minimum, such as when the length-direction dimension of each conductor pad CP is made roughly the same as the length-direction dimension L1 (refer to FIG. 4), which reduces the mounting area needed to mount the multilayer ceramic capacitor 10 on the circuit board CB and thereby contributes to high-density mounting.

Also, the first clearance CL1 on the first external electrode 12 side includes a length-direction gap GP1a and two width-direction gaps GP1b continuing from the length-direction gap GP1a, while the second clearance CL2 on the second external electrode 13 side includes a length-direction gap GP2a and two width-direction gaps GP2b continuing from the length-direction gap GP2a. As a result, the molten solder on the first external electrode 12 side flows smoothly in a manner filling the length-direction gap GP1a and the two width-direction gaps GP1b continuing from the length-direction gap GP1a, while the molten solder on the second external electrode 13 side flows smoothly in a manner filling the length-direction gap GP2a and the two width-direction gaps GP2b continuing from the length-direction gap GP2a. In other words, fillet formation in the bonding process can effectively be suppressed, and this contributes to suppressing the occurrence of the aforementioned separation phenomena.

Furthermore, the fifth face f5 is a convex curved face having a bulged center in the width direction, except for the parts corresponding to the first tapering face f5a and second tapering face f5b, which means that the two width-direction gaps GP1b constituting the first clearance CL1 also extend to the outer edges, in the width direction, of the second part 12b of the first external electrode 12, while the two width-direction gaps GP2b constituting the second clearance CL2 also extend to the outer edges, in the width direction, of the second part 13b of the second external electrode 13. This makes it possible to increase the amount of solder accommodated in the first clearance CL1 on the first external electrode 12 side and in the second clearance CL2 on the second external electrode 13 side, and accordingly fillet formation in the bonding process can be effectively suppressed even when the amount of cream solder SOLa provided on the surface of each conductor pad CP exceeds the tolerance on the plus side (the over tolerance). In addition, the area over which the solder SOL contacts the first external electrode 12, and the area over which it contacts the second external electrode 13, can be increased, which also contributes to increasing the bonding force.

Next, the verification results of the aforementioned effects, especially the verification results pertaining to the suppression of occurrence of separation phenomena, are explained.

Figure 1B:
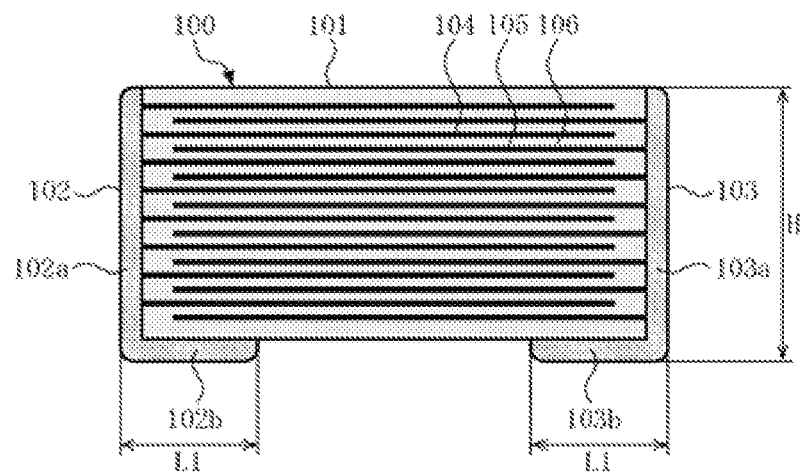
FIG. 1B is a section view of FIG. 1A along line S11-S11.
Figure 1C:
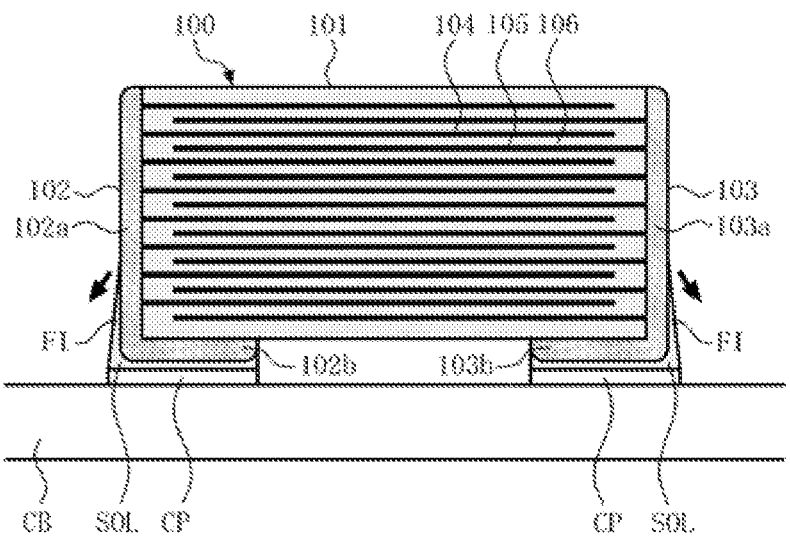
FIG. 1C is a drawing that illustrates a condition where the conventional multilayer ceramic capacitor shown in FIGS. 1A and 1B is mounted on a circuit board.
Figure 2:
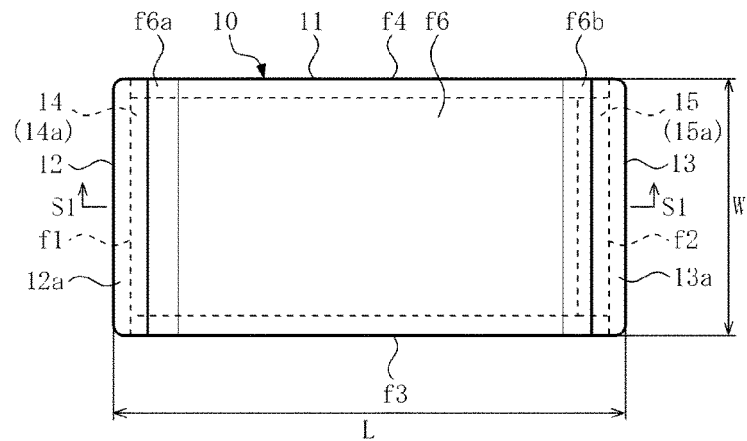
FIG. 2 is a view of a multilayer ceramic capacitor to which the present invention is applied, from the sixth face f6 side of the capacitor body.

For verification, 100 evaluation multilayer ceramic capacitors each corresponding to the multilayer ceramic capacitor 10 shown in FIGS. 2 to 6, and 100 comparison multilayer ceramic capacitors each corresponding to the multilayer ceramic capacitor 100 shown in FIGS. 1A through 1C, were manufactured according to <First Manufacturing Example> above, and 200 test circuit boards were also prepared. The specifications of the evaluation multilayer ceramic capacitor, specifications of the comparison multilayer ceramic capacitor, and specifications of the test circuit board, are described below. It should be noted that all specification values are design reference values and do not include manufacturing tolerances.

<Specification of Evaluation Multilayer Ceramic Capacitor (Citing the Symbols in FIGS. 2 to 6)>

The multilayer ceramic capacitor 10 has a length L of 400 µm, width W of 200 µm, and height H of 200 µm.

The capacitor body 11 has a length of 370 µm, width of 200 µm, and height of 185 µm.

The primary component of the capacitor body 11, except for each first internal electrode layer 14 and each second internal electrode layer 15, is barium titanate.

The primary component of each first internal electrode layer 14 and each second internal electrode layer 15 is nickel, each layer has a thickness of 0.5 µm, and there are 145 first internal electrode layers and 145 second internal electrode layers.

The thickness of each dielectric layer 16 present between a first internal electrode layer 14 and a second internal electrode layer 15, is 0.5 µm.

The thickness of the width-direction margin, and that of the height-direction margin, of the capacitor body 11, are 15 µm, respectively.

The radius of curvature of the fifth face f5 of the capacitor body 11, except for the parts corresponding to the first tapering face 5a and second tapering face 5b, is 750 µm.

The radius of curvature of the sixth face f6 of the capacitor body 11, except for the parts corresponding to the first tapering face 6a and second tapering face 6b, is 750 µm.

The first tapering face 5a and second tapering face 5b of the fifth face f5 of the capacitor body 11 each have a height-direction dimension (h1−h2 shown in FIG. 5A) of 10 µm and a length-direction dimension of 20 µm.

The first tapering face 6a and second tapering face 6b of the sixth face f6 of the capacitor body 11 each have a height-direction dimension (h1−h2 shown in FIG. 5A) of 10 µm and a length-direction dimension of 20 µm.

Figure 4:
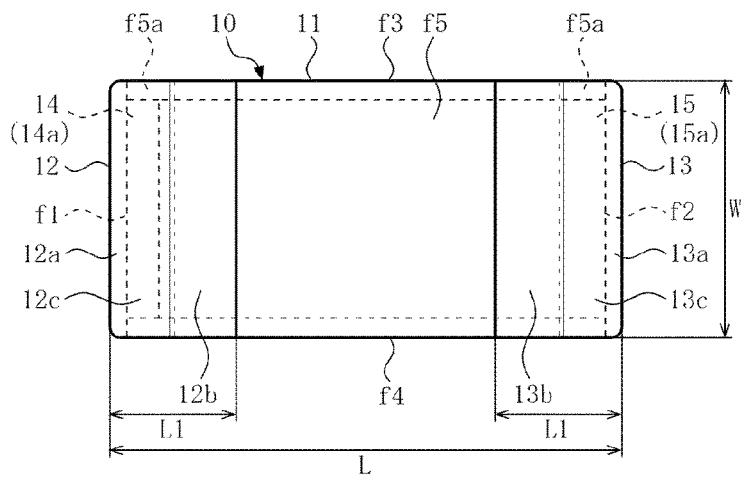
FIG. 4 is a view of the multilayer ceramic capacitor shown in FIG. 2 from the fifth face f5 side of the capacitor body.

The length-direction dimension L1 of the first external electrode 12, and the length-direction dimension L1 of the second external electrode 13, as shown in FIG. 4, are 100 µm, respectively.

The thickness of the first external electrode 12, and that of the second external electrode 13, are 15 µm, respectively.

The first external electrode 12 and second external electrode 13 each have a three-layer structure, constituted by a base film whose primary component is copper and thickness is 10 µm, an intermediate film whose primary component is nickel and thickness is 2 µm, and a surface film whose primary component is tin and thickness is 3 µm.

<Specifications of Comparison Multilayer Ceramic Capacitor (Citing the Symbols in FIGS. 2 to 6)>

Same as the evaluation multilayer ceramic capacitor except that the fifth face f5 of the capacitor body 11 is roughly flat and has no first tapering face f5a or second tapering face f5b, and that the sixth face f6 is roughly flat and has no first tapering face f6a or second tapering face f6b.

<Specifications of Test Circuit Board (Referring to FIG. 7)>

The thickness of the circuit board CB is 150 µm.

The primary component of the circuit board CB is epoxy resin.

Each conductor pad CP has a length of 120 µm, width of 200 µm, and thickness of 15 µm.

The interval between the conductor pads CP is 300 µm.

The primary component of each conductor pad CP is copper.

The cream solder SOLa is tin-antimony solder.

The amount of cream solder SOLa is 30 µm in equivalent thickness.

The first external electrodes and second external electrodes of the evaluation multilayer ceramic capacitors were installed on the cream solder printed on the respective conductor pads of the test circuit boards, and the resulting boards were introduced into a reflow furnace, to prepare a total of 100 mounted evaluation boards each having an evaluation multilayer ceramic capacitor mounted on it. Also, the first external electrodes and second external electrodes of the comparison multilayer ceramic capacitors were installed on the cream solder printed on the respective conductor pads of the test circuit boards, and the resulting boards were introduced into a reflow furnace, to prepare a total of 100 mounted comparison boards each having a comparison multilayer ceramic capacitor mounted on it.

The effects were verified by testing the 100 mounted evaluation boards and 100 mounted comparison boards 30 times each, where each test consisted of warping the board in the direction indicated by the two-dot chain line in FIG. 8A and then restoring its original shape, and then observing each multilayer ceramic capacitor to see whether or not the first part of the first external electrode and the first part of the second external electrode had separated after the tests. It should be noted that the aforementioned test was conducted by using support tools to support the locations (refer to the positions of the ∇ marks in FIG. 8A) on the outer sides of the respective conductor pads on one side of each mounted board, and in this condition, using a pressure tool to push up 50 μm the location corresponding to the length-direction center position of the multilayer ceramic capacitor (refer to the position shown by the thick broken-line arrow in FIG. 8A) on the other side of the mounted board, followed by recovering the original condition before the push-up.

As a result of the observation, separation of the first part of the first external electrode, or the first part of the second external electrode, of the evaluation capacitor, was not found on any of the 100 mounted evaluation boards; whereas, separation of the first part of the first external electrode, or the first part of the second external electrode, of the evaluation capacitor, was found on five of the 100 mounted comparison boards. This confirms that the multilayer ceramic capacitor 10 is effective in suppressing the occurrence of the separation phenomena described earlier.

Next, examples of variation of the multilayer ceramic capacitor 10 are explained.

First Example of Variation

In FIGS. 2 to 6, the sixth face f6 of the capacitor body 11 has the first tapering face f6a and second tapering face f6b, and is a convex curved face with a bulged center in the width direction except for the parts corresponding to the first tapering face f6a and second tapering face f6b; however the aforementioned effects depend on the mode of the fifth face f5, which means that the first tapering face f6a and second tapering face f6b can be eliminated from the sixth face f6 of the capacitor body 11, to make the entire sixth face f6 a convex curved face with a bulged center in the width direction, or to make the entire sixth face f6 a roughly flat surface.

Second Example of Variation

In FIGS. 2 to 6, the width-direction dimension of the first external electrode 12 corresponds to the width-direction dimension (width W) of the capacitor body 11, while the width-direction dimension of the second external electrode 13 corresponds to the width-direction dimension (width W) of the capacitor body 11; however, effects similar to those explained above can still be achieved even when the width-direction dimensions of the first external electrode 12 and second external electrode 13 are slightly smaller than the width W, respectively.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-035705, filed Feb. 26, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:
1. A multilayer ceramic capacitor comprising:
(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;
(2) a first external electrode having a first part along the first face, and a second part along the fifth face, of the capacitor body, where ends of the multiple first internal electrode layers are connected to the first part, respectively; and
(3) a second external electrode having a first part along the second face, and a second part along the fifth face, of the capacitor body, where ends of the multiple second internal electrode layers are connected to the first part, respectively.

wherein:
the capacitor body has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;
the first external electrode has, between the first part and the second part, a third part along the first tapering face of the capacitor body;

the second external electrode has, between the first part and the second part, a third part along the second tapering face of the capacitor body;

the first external electrode and second external electrode are each shaped in such a way that, when an exterior face of the second part of the first external electrode and an exterior face of the second part of the second external electrode are each contacting a virtual plane parallel to the fifth face, a first clearance, which is formed between an exterior face of the third part of the first external electrode and the virtual plane as measured in the height direction, continuously narrows in the length direction from the first part side to the second part side of the third part of the first external electrode in a manner extending to an overlapping region where the first and second internal electrode layers overlap as viewed from a direction toward the fifth face, while a second clearance, which is formed between an exterior face of the third part of the second external electrode and the virtual plane as measured in the height direction, continuously narrows in the length direction from the first part side to the second part side of the third part of the second external electrode in a manner extending to the overlapping region of the first and second internal electrode layers as viewed from a direction toward the fifth face;

the first tapering face on the fifth face of the capacitor body is a convex curved face having a bulged center in the width direction and inclined toward the first face, while the second tapering face on the fifth face is a convex curved face having a bulged center in the width direction and inclined toward the second face; and the first clearance includes a length-direction gap formed between the exterior face of the third part of the first external electrode and the virtual plane and two width-direction gaps continuing from the length-direction gap; and the second clearance includes a length-direction gap formed between the exterior face of the third part of the second external electrode and the virtual plane and two width-direction gaps continuing from the length-direction gap.

2. A multilayer ceramic capacitor according to claim 1, wherein the first and second external electrodes have roughly an L shape as viewed from a direction toward the third or fourth face.

3. A multilayer ceramic capacitor comprising:
(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;
(2) a first external electrode having a first part along the first face, and a second part along the fifth face, of the capacitor body, where ends of the multiple first internal electrode layers are connected to the first part, respectively; and
(3) a second external electrode having a first part along the second face, and a second part along the fifth face, of the capacitor body, where ends of the multiple second internal electrode layers are connected to the first part, respectively;
wherein the capacitor body has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;

wherein the first external electrode has, between the first part and the second part, a third part along the first tapering face of the capacitor body;

wherein the second external electrode has, between the first part and the second part, a third part along the second tapering face of the capacitor body; and wherein the first external electrode and second external electrode are each shaped in such a way that, when an exterior face of the second part of the first external electrode and an exterior face of the second part of the second external electrode are each contacting a virtual plane, a first clearance that narrows from an outer side toward an inner side is formed between an exterior face of the third part of the first external electrode and the virtual plane, while a second clearance that narrows from an outer side toward an inner side is formed between an exterior face of the third part of the second external electrode and the virtual plane, wherein the first and second clearances extend to an overlapping region where the first and second internal electrode layers overlap as viewed from a direction toward the fifth face, wherein each of the first and second external electrodes has a thickness in a manner that a thickest portion is located closer to an inner side end of each external electrode than to an outer side of each external electrode as viewed from a direction toward the fifth face.

4. A multilayer ceramic capacitor according to claim 1, wherein the first external electrode and the second external electrode are each constituted by a base film, an intermediate film, and a surface film, wherein a primary component of the base film is copper.

5. A multilayer ceramic capacitor according to claim 1, wherein the first external electrode and the second external electrode are each constituted by a base film, an intermediate film, and a surface film, wherein a primary component of the intermediate film is copper.

6. A multilayer ceramic capacitor according to claim 1, wherein a primary component of each first internal electrode layer and each second internal electrode layer is chosen from copper, palladium, platinum, silver, gold, and an alloy of the foregoing.

7. A multilayer ceramic capacitor according to claim 1, wherein the multilayer ceramic capacitor has its length L, width W, and height H which meet a relationship of "Width W >Length L =Height H" or "Width W>Length L >Height H."

8. A multilayer-ceramic-capacitor-mounted circuit board comprising a circuit board and the multilayer ceramic capacitor of claim 1 which is mounted on the circuit board.

9. A multilayer ceramic capacitor comprising:
(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;
(2) a first external electrode having a first part along the first face, and a second part along the fifth face, of the capacitor body, where ends of the multiple first internal electrode layers are connected to the first part, respectively; and (3) a second external electrode having a first part along the second face, and a second part along the fifth face, of the capacitor body, where ends of the multiple second internal electrode layers are connected to the first part, respectively;

wherein:

the capacitor body has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;

the first external electrode has, between the first part and the second part, a third part along the first tapering face of the capacitor body;

the second external electrode has, between the first part and the second part, a third part along the second tapering face of the capacitor body;

the first external electrode and second external electrode are each shaped in such a way that, when an exterior face of the second part of the first external electrode and an exterior face of the second part of the second external electrode are each contacting a virtual plane parallel to the fifth face, a first clearance, which is formed between an exterior face of the third part of the first external electrode and the virtual plane as measured in the height direction, continuously narrows in the length direction from the first part side to the second part side of the third part of the first external electrode in a manner extending to an overlapping region where the first and second internal electrode layers overlap as viewed from a direction toward the fifth face, while a second clearance, which is formed between an exterior face of the third part of the second external electrode and the virtual plane as measured in the height direction, continuously narrows in the length direction from the first part side to the second part side of the third part of the second external electrode in a manner extending to the overlapping region of the first and second internal electrode layers as viewed from a direction toward the fifth face;

the first tapering face and second tapering face on the fifth face of the capacitor body are convex curved faces, respectively, that satisfy a condition of h1 >h2 >h3 where h1 represents a maximum height-direction dimension between the fifth face and sixth face of the capacitor body, h2 represents a maximum height-direction dimension of the first face and that of the second face of the capacitor body, respectively, and h3 represents a minimum height-direction dimension of the first face and that of the second face of the capacitor body, respectively; and the first clearance includes a length-direction gap formed between the exterior face of the third part of the first external electrode and the virtual plane and two width-direction gaps continuing from the length-direction gap; and the second clearance includes a length-direction gap formed between the exterior face of the third part of the second external electrode and the virtual plane and two width-direction gaps continuing from the length-direction gap.

10. A multilayer ceramic capacitor according to claim 1, wherein the first tapering face on the fifth face of the capacitor body is a convex curved face having a bulged center in the width direction and inclined toward the first face, while the second tapering face on the fifth face is a convex curved face having a bulged center in the width direction and inclined toward the second face.

11. A multilayer ceramic capacitor comprising:

(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;

(2) a first external electrode having a first part along the first face, and a second part along the fifth face, of the capacitor body, where ends of the multiple first internal electrode layers are connected to the first part, respectively; and (3) a second external electrode having a first part along the second face, and a second part along the fifth face, of the capacitor body, where ends of the multiple second internal electrode layers are connected to the first part, respectively;

wherein:

the capacitor body has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;

the first external electrode has, between the first part and the second part, a third part along the first tapering face of the capacitor body;

the second external electrode has, between the first part and the second part, a third part along the second tapering face of the capacitor body; the first external electrode and second external electrode are each shaped in such a way that, when an exterior face of the second part of the first external electrode and an exterior face of the second part of the second external electrode are each contacting a virtual plane parallel to the fifth face, a first clearance, which is formed between an exterior face of the third part of the first external electrode and the virtual plane as measured in the height direction, continuously narrows in the length direction from the first part side to the second part side of the third part of the first external electrode in a manner extending to an overlapping region where the first and second internal electrode layers overlap as viewed from a direction toward the fifth face, while a second clearance, which is formed between an exterior face of the third part of the second external electrode and the virtual plane as measured in the height direction, continuously narrows in the length direction from a first part side to a second part side of the third part of the second external electrode in a manner extending to the overlapping region of the first and second internal electrode layers as viewed from a direction toward the fifth face; and the fifth face of the capacitor body is a convex curved face having a bulged center in the width direction, except for parts corresponding to the first tapering face and second tapering face.

12. A multilayer ceramic capacitor according to claim 11, wherein the first tapering face on the fifth face of the capacitor body is a convex curved face having a bulged center in the width direction and inclined toward the first face, while the second tapering face on the fifth face is a convex curved face having a bulged center in the width direction and inclined toward the second face.

13. A multilayer ceramic capacitor according to claim 11, wherein the first tapering face and second tapering face on the fifth face of the capacitor body are convex curved faces, respectively, that satisfy a condition of h1>h2>h3 where h1 represents a maximum height-direction dimension between the fifth face and sixth face of the capacitor body, h2 represents a maximum height-direction dimension of the first face and that of the second face of the capacitor body, respectively, and h3 represents a minimum height-direction dimension of the first face and that of the second face of the capacitor body, respectively.

14. A multilayer ceramic capacitor according to claim 12, wherein the first tapering face and second tapering face on the fifth face of the capacitor body are convex curved faces, respectively, that satisfy a condition of h1>h2>h3 where h1 represents a maximum height-direction dimension between the fifth face and sixth face of the capacitor body, h2 represents a maximum height-direction dimension of the first face and that of the second face of the capacitor body, respectively, and h3 represents a minimum height-direction dimension of the first face and that of the second face of the capacitor body, respectively.

15. A multilayer ceramic capacitor according to claim 12, wherein the first clearance includes a length-direction gap formed between the exterior face of the thirdpart of the first external electrode and the virtual plane and two width-direction gaps continuing from the length-direction gap; and the second clearance includes a length-direction gap formed between the exterior face of the third part of the second external electrode and the virtual plane and two width-direction gaps continuing from the length- direction gap.

16. A multilayer ceramic capacitor according to claim 13, wherein the the first clearance includes a length-direction gap formed between the exterior face of the thirdpart of the first external electrode and the virtual plane and two width-direction gaps continuingfrom the length- direction gap; and the second clearance includes a length-direction gap formedbetween the exterior face of the third part of the second external electrode and the virtual plane and two width-direction gaps continuing from the length-direction gap.

* * * * *

UNITED STATES PATENT AND TRADEMARK OFFICE
CERTIFICATE OF CORRECTION

PATENT NO. : 10,734,160 B2  
APPLICATION NO. : 15/438610  
DATED : August 4, 2020  
INVENTOR(S) : Kotaro Mizuno Page 1 of 1

It is certified that error appears in the above-identified patent and that said Letters Patent is hereby corrected as shown below:

In the Claims

Column 15, Line 13, in Claim 1, "the" in front of "first part side" should be --a--.

Column 15, Lines 13-14, in Claim 1, "the" in front of "second part side" should be --a--.

Column 17, Line 32, in Claim 9, "the" in front of "first part side" should be --a--.

Column 17, Lines 32-33, in Claim 9, "the" in front of "second part side" should be --a--.

Column 17, Line 66, in Claim 10, "1" after "claim" should be --9--.

Column 18, Line 39, in Claim 11, after the ";", a new line beginning with "the first external electrode" should be started.

Column 18, Lines 48-49, in Claim 11, "the" in front of "first part side" should be --a--.

Column 18, Line 49, in Claim 11, "the" in front of "second part side" should be --a--.

Column 18, Line 57, in Claim 11, "a" in front of "first part side" should be --the--.

Column 18, Lines 57-58, in Claim 11, "a" in front of "second part side" should be --the--.

Column 20, Line 18, in Claim 16, a space between "continuing" and "from" should be inserted.

Signed and Sealed this  
Sixth Day of October, 2020

Andrei Iancu  
*Director of the United States Patent and Trademark Office*